United States Patent
Alberth, Jr.

(10) Patent No.: US 9,971,453 B2
(45) Date of Patent: May 15, 2018

(54) TOUCH SCREEN DEVICE WITH USER INTERFACE MODE SELECTION BASED ON HUMIDITY

(71) Applicant: Johnson Controls Technology Company, Plymouth, MI (US)

(72) Inventor: William P. Alberth, Jr., Prairie Grove, IL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days. days.

(21) Appl. No.: 15/298,191

(22) Filed: Oct. 19, 2016

(65) Prior Publication Data

US 2018/0107336 A1 Apr. 19, 2018

(51) Int. Cl.
*G06F 3/041* (2006.01)
*G05D 23/19* (2006.01)

(52) U.S. Cl.
CPC ....... *G06F 3/0418* (2013.01); *G05D 23/1917* (2013.01); *G06F 2203/04104* (2013.01)

(58) Field of Classification Search
CPC ............ G06F 3/0418; G05D 23/1917
See application file for complete search history.

(56) References Cited

U.S. PATENT DOCUMENTS

| | | | |
|---|---|---|---|
| 2007/0244576 A1 | 10/2007 | Potucek et al. | |
| 2013/0345882 A1* | 12/2013 | Dushane | G05B 15/02 700/276 |
| 2015/0186004 A1* | 7/2015 | Gordon | G06F 3/0488 345/173 |
| 2016/0162058 A1* | 6/2016 | You | G06F 3/03547 345/157 |

* cited by examiner

*Primary Examiner* — Kevin M Nguyen
(74) *Attorney, Agent, or Firm* — Foley & Lardner LLP

(57) ABSTRACT

A thermostat for a building space includes a touch screen user interface, a selector, a single-touch controller, and a multi-touch controller. The touch screen user interface is configured to present display data to a user and receive touch-based input from the user. The selector is configured to select an operating mode for the touch screen user interface based on one or more environmental conditions of the building space. The single-touch controller is configured to operate the touch screen user interface in a single-touch operating mode when the single-touch operating mode is selected by the selector. The multi-touch controller is configured to operate the touch screen user interface in a multi-touch operating mode when the multi-touch operating mode is selected by the selector.

20 Claims, 8 Drawing Sheets

TOUCH SCREEN DEVICE WITH USER INTERFACE MODE SELECTION BASED ON HUMIDITY

BACKGROUND

The present disclosure relates generally to touch-sensitive input devices for use in monitoring and controlling a building management system or a building space. The present disclosure relates more particularly to the operation of touch-sensitive input devices under high humidity conditions.

Touch-sensitive input devices can be used as part of a building management system to present information to a user and to receive touch-based input from the user. Some touch-sensitive input devices include a touch-sensitive panel overlaid with an electronic display screen to provide a touch-sensitive display. Touch-sensitive input devices can include, for example, control panels, thermostats, computer monitors, tablets, laptops, or other devices that present information to a user and receive input from a user via a touch-sensitive panel. Several examples of a touch-sensitive thermostat for a building space are described in detail in U.S. patent application Ser. No. 15/146,134 filed May 4, 2016, U.S. Provisional Patent Application No. 62/247,672 filed Oct. 10, 2015, and U.S. Provisional Patent Application No. 62/275,202 filed Jan. 5, 2016. The entire disclosure of each of these patent applications is incorporated by reference herein.

Touch-sensitive input devices typically include hardware configured to detect the location of one or more fingers or stylus pens relative to a touch screen. In some cases, high humidity conditions can cause the location detection to become unreliable. It would be desirable to improve the accuracy and reliability of touch-sensitive input devices under high humidity conditions.

SUMMARY

A thermostat for a building space includes a touch screen user interface, a selector, a single-touch controller, and a multi-touch controller. The touch screen user interface is configured to present display data to a user and receive touch-based input from the user. The selector is configured to select an operating mode for the touch screen user interface based on one or more environmental conditions of the building space. The single-touch controller is configured to operate the touch screen user interface in a single-touch operating mode when the single-touch operating mode is selected by the selector. The multi-touch controller is configured to operate the touch screen user interface in a multi-touch operating mode when the multi-touch operating mode is selected by the selector.

In some embodiments, the thermostat further includes a network interface configured to receive the environmental conditions of the building space from at least one of one or more weather servers and one or more remote sensors.

In some embodiments, the thermostat further includes one or more sensors configured to measure the one or more environmental conditions of the building space.

In some embodiments, the sensors include a humidity sensor configured to measure a humidity value of the building space. The selector may be configured to select the operating mode based on the measured humidity value.

In some embodiments, the sensors include a temperature sensor configured to measure a temperature value of the building space. The selector may be configured to select the operating mode based on the measured temperature value.

In some embodiments, the selector is configured to select the operating mode for the touch screen user interface by comparing at least one of the environmental conditions of the building space to a threshold value. The environmental conditions of the building space may include at least one of a humidity value of the building space and a dew point of the building space.

In some embodiments, the selector is configured to select the single-touch operating mode for the touch screen user interface in response to a determination that a humidity of the building space exceeds a humidity threshold. The selector may select the multi-touch operating mode for the touch screen user interface in response to a determination that the humidity of the building space does not exceed the humidity threshold.

In some embodiments, the thermostat further includes an HVAC controller. The HVAC controller may be configured to receive one or more environmental setpoints via the touch screen user interface. In some embodiments, the HVAC controller may be configured to cause HVAC equipment communicatively coupled to the thermostat to control the one or more environmental conditions of the building space to the one or more environmental setpoints.

Another implementation of the present disclosure is a touch-sensitive display device including a touch screen user interface configured to present display data to the user and receive touch-based input from the user. The touch-sensitive display device includes a selector configured to select a touch-based input mode for the touch screen user interface based on one or more environmental conditions. The touch-sensitive display device includes a touch screen controller configured to operate the touch screen user interface based on the operating mode selected by the selector.

In some embodiments, the touch screen controller includes a single-touch controller configured to operate the touch screen user interface in a single-touch operating mode when the single-touch operating mode is selected by the selector. In some embodiments, the touch screen controller includes a multi-touch controller configured to operate the touch screen user interface in a multi-touch operating mode when the multi-touch operating mode is selected by the selector.

In some embodiments, the device further includes a network interface configured to receive the environmental conditions from one or more weather servers.

In some embodiments, the selector is configured to select the operating mode for the touch screen user interface by comparing at least one of the environmental conditions to a threshold value. The environmental conditions may include at least one of a humidity value and a dew point value.

In some embodiments, the selector is configured to select a single-touch operating mode for the touch screen user interface in response to a determination that a humidity of the building space exceeds a humidity threshold. In some embodiments, the selector is configured to select a multi-touch operating mode for the touch screen user interface in response to a determination that the humidity of the building space does not exceed the humidity threshold.

In some embodiments, the device further includes an HVAC controller. The HVAC controller may be configured to receive one or more environmental setpoints via the touch screen user interface. The HVAC controller may also be configured to cause HVAC equipment communicatively coupled to the device to control the one or more environmental conditions of a building space to the environmental setpoints.

Another implementation of the present disclosure is a method for operating a thermostat for a building space. The method includes presenting display data to a user via a touch screen user interface and receiving touch-based input from the user via the touch screen user interface. The method includes detecting one or more environmental conditions of the building space. The method includes automatically selecting, by a selector of the thermostat, an operating mode for the touch screen user interface based on the one or more environmental conditions of a building space. The method includes operating the touch screen user interface in a single-touch operating mode when the single-touch operating mode is selected by the selector. The method includes operating the touch screen user interface in a multi-touch operating mode when the multi-touch operating mode is selected by the selector.

In some embodiments, the method further includes receiving the environmental conditions from at least one of one or more weather servers and one or more remote sensors.

In some embodiments, the method further includes receiving one or more environmental setpoints via the touch screen user interface and causing HVAC equipment communicatively coupled to the thermostat to control the one or more environmental conditions of the building space to the one or more environmental setpoints.

In some embodiments, the method further includes measuring the environmental conditions with one or more sensors. The sensors include a humidity sensor configured to measure a humidity value of a building space and a temperature sensor configured to measure a temperature value of the building space.

In some embodiments, selecting the operating mode for the touch screen user interface based the environmental conditions of the building space includes comparing at least one of the environmental conditions of the building space to a threshold value. The environmental conditions of the building space may include at least one of a humidity value of the building space and a dew point of the building space.

In some embodiments, selecting the operating mode for the touch screen user interface based the environmental conditions of the building space includes selecting the single-touch operating mode for the touch screen user interface in response to a determination that a humidity of the building space exceeds a humidity threshold. In some embodiments, selecting the operating mode for the touch screen user interfaced based on the environmental conditions of the building space includes selecting the multi-touch operating mode for the touch screen user interface in response to a determination that the humidity of the building space does not exceed the humidity threshold.

DETAILED DESCRIPTION

Overview

Referring generally to the FIGURES, systems and methods for switching between operating a touch screen device in a single-touch mode and a multi-touch mode are shown, according to various exemplary embodiments. A mutual capacitive touch screen may be configured to determine the location of a single touch and/or the locations of multiple concurrent touches. Sensing multiple concurrent touches (i.e., multi-touch mode) may prove difficult in a certain environmental conditions. For example, if the touch screen device is located in a zone with a high humidity and/or a high dew point, the accuracy in sensing multiple concurrent touch locations may be poor, or the controller may be unable to distinguish between multiple touches to the display and may only be able to return an average value of the multiple touches. For this reason, it may be ideal to operate the touch screen in a single touch mode during periods of certain environmental conditions.

A multi-touch mode may allow a user to simultaneously place two fingers on the touch screen of the touch screen device and perform actions such as zooming in and out on and rotating images. Multi-touch mode may be most desirable when humidity and/or dew point values are low. A single-touch mode may sense only one touch to the touch screen at a time. In a single-touch user interface mode, a user may be presented with certain buttons such as a zoom in/out button and/or a rotate left/right button which are not required when multi-touch user interface mode is active. In, single-touch mode the touch screen device may not require concurrent touches to the touch screen, may present a message to the user that multiple concurrent touches are not being sensed, and/or may determine an average of the locations of multiple concurrent touches.

In some embodiments, a switching signal may be generated based on environmental conditions causing the touch screen of the touch screen device to operate in either a single-touch mode or a multi-touch mode. The environmental conditions may include a temperature, a dew point, and/or a humidity. It may be advantageous for the performance of the user interface to only operate in a single-touch mode when the ambient humidity is above a humidity threshold. In various embodiments, it may be advantageous for the performance of the user interface to operate in a single-touch mode when the dew point is above a dew point threshold. In various embodiments, it may be advantageous for the performance of the user interface to operate in a single-touch mode when the ambient temperature of the zone which the display device is located is equal to the dew point and/or below a dew point threshold.

Building Management System and HVAC System

Figure 1:
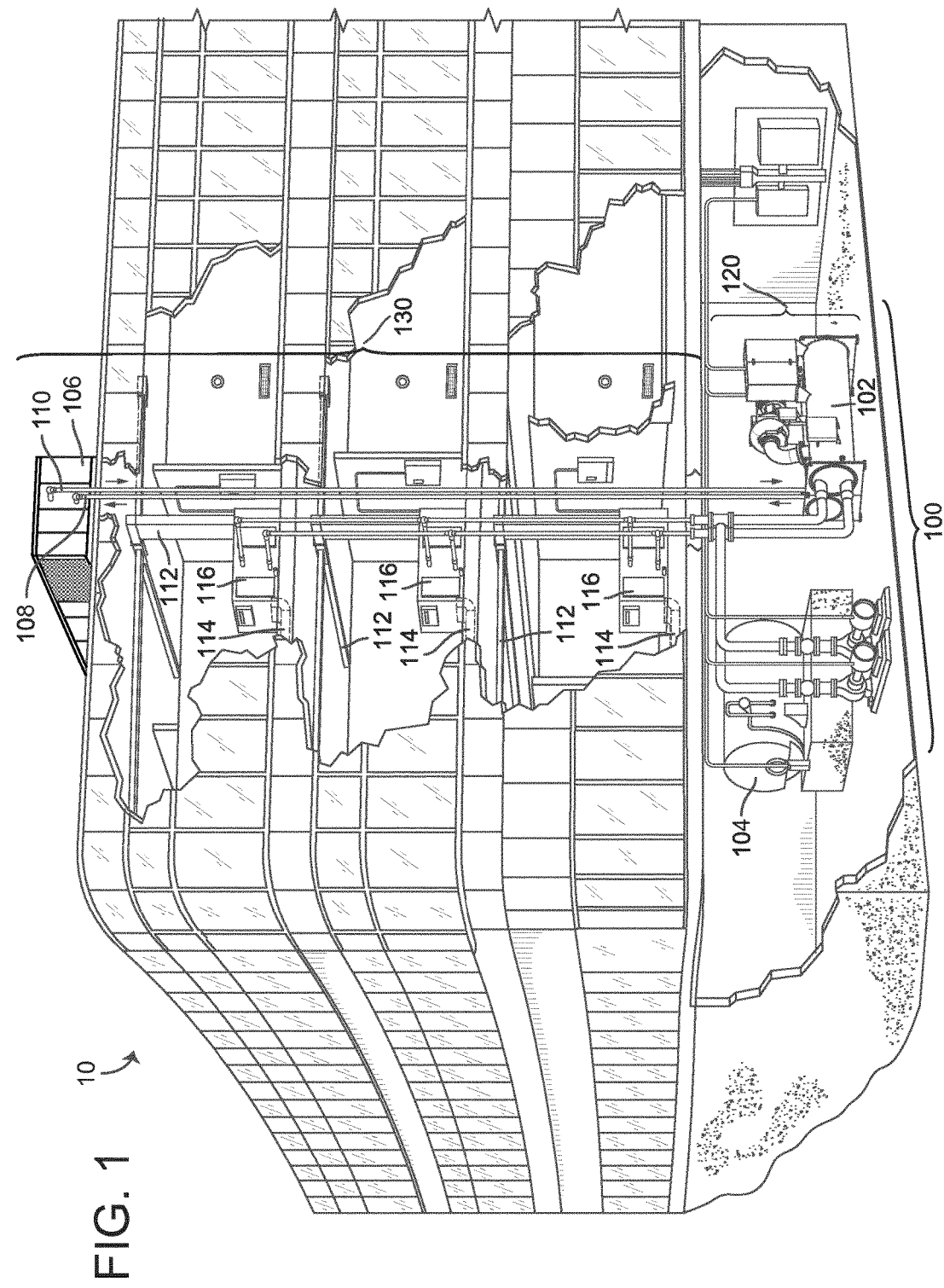
FIG. 1 is a drawing of a building equipped with a HVAC system and including zone controllers in each of the building zones, according to an exemplary embodiment.

Referring now to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Touch-Sensitive Display Device

Figure 2:
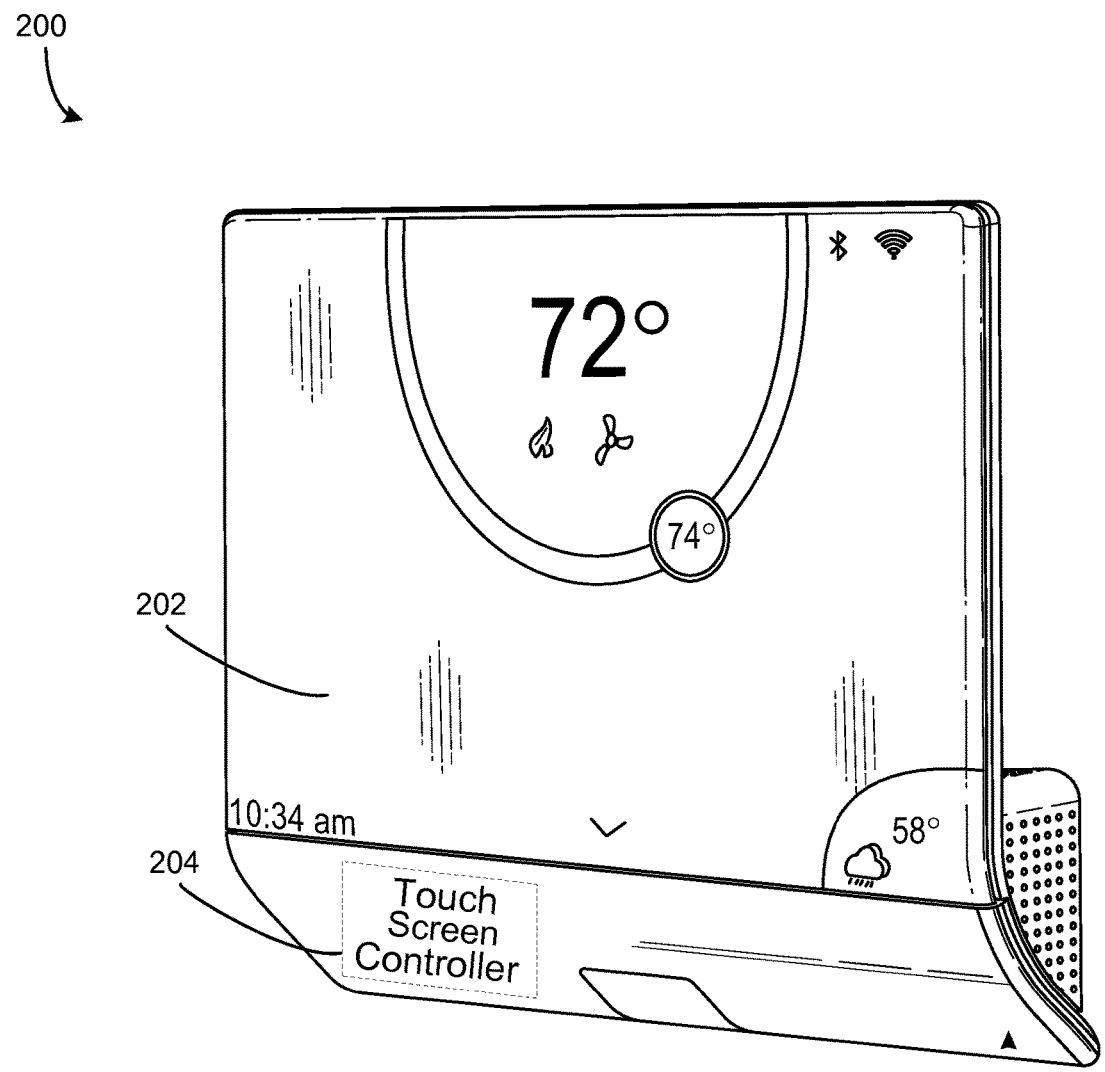
FIG. 2 is a drawing of a touch screen device located in the building of FIG. 1, according to an exemplary embodiment.

Referring now to FIG. 2, a display device 200 is shown according to an exemplary embodiment. Display device 200 is shown to include a touch screen 202 and a touch screen controller 204. In some embodiments, touch screen 202 is one or a combination of multiple types of touch screens. The touch screen types may be a resistive touch screen, a surface acoustic wave touch screen, and/or a capacitive touch screen. A capacitive touch screen may utilize surface capacitance and/or projected capacitance. Further, projected capacitance may be a mutual capacitance type or a self-capacitance type. In some embodiments, touch screen 202 is a projected capacitance touch screen. Touch screen 202 may have multiple rows and columns of conductive material etched onto sheets of glass forming a grid. Voltages may be applied to the grid to create an electrostatic field across the grid. When the electrostatic field is interrupted (e.g. interrupted by a human finger and/or stylus) changes in capacitance can be measured to identify the location of the touch on touch screen 202.

In some embodiments, touch screen 202 is a mutual capacitance touch screen. A mutual capacitance touch screen may allow touch screen controller 204 to sense a single-touch to touch screen 202 and/or a multi-touch to touch screen 202. Touch screen controller 204 may be a combination of a processing circuit and memory configured to operate touch screen 202. In some embodiments, the processing circuit is at least one or a combination of a general purpose or specific purpose processor, an application specific integrated circuit (ASIC), one or more field programmable gate arrays (FPGAs), a group of processing components, or other suitable processing components. The processor may be configured to execute computer code or instructions stored in memory or received from other computer readable media (e.g., CDROM, network storage, a remote server, etc.). The memory of touch screen controller 204 may be at least one or a combination of random-access memory (RAM), read-only memory (ROM), hard drive storage, temporary storage, non-volatile memory, flash memory, optical memory, or any other suitable memory for storing software objects and/or computer instructions Touch screen 202 may have row and column traces printed and/or screened onto layered sheets of glass. The rows and columns may form a grid. A capacitance may be measurable at each intersection of the grid. Touch screen Controller 204 may be able to measure a capacitance at each printed trace or intersection of traces when a voltage is applied to the etched traces on the layered sheets of glass. Touching a single location on touch screen 202 (i.e., a "single-touch") may change the capacitance of one or more individual capacitors surrounding the location of the touch. Touching multiple locations on touch screen 202 concurrently (i.e., a "multi-touch") may concurrently change the capacitance of one or more individual capacitors surrounding each touch location. Touch screen controller 204 may be configured to determine the capacitance of each intersection and determine the location of a single-touch and/or multi-touch to touch screen 202.

In some embodiments, a multi-touch to touch screen 202 may be a gesture. In some embodiments, the gesture is a pinch, a drag, a flick, or a spread. In some embodiments, a touch screen controller may identify that two fingers and/or styli are placed on the touch screen 202. The touch screen controller may identify these touches to the touch screen 202 as touch locations and may determine that the touch locations are moving closer together. The touch screen controller may interpret this gesture as a pinch and may identify a rate at which the touch points are nearing each other. In some embodiments, touch screen controller 204 may interpret two touch locations moving away from each other as a spread. The touch screen controller may determine a rate of change at which the touch locations are moving away from each other. Further, touch screen controller 204 may identify single-touches to the touch screen 202. In some embodiments, these single-touches are a tap, a nudge, a drag and/or a flick. Touch screen controller 204 may determine the nature of the single-touch based on the way the single-touch location moves across touch screen 202.

In some embodiments, display device 200 may be a thermostat for the building 10 as described with reference to FIG. 1. In some embodiments, the touch screen 202 may allow the user to interact with the thermostat and perform actions such as adjust setpoints, view zone statuses, adjust thermostat settings and/or any other action that could be performed by interacting with a display interface for a thermostat. In various embodiments, display device 200 may be a cell phone, a tablet, a touch screen laptop computer, a touch screen computer display, a touch screen kiosk, a touch screen television, a touch screen digital camera, a touch screen lighting controller, a touch screen swimming pool controller, a touch screen hot tub controller, a touch screen shower controller, and/or any other device that includes a touch screen interface (e.g. touch screen 202).

Figure 3:
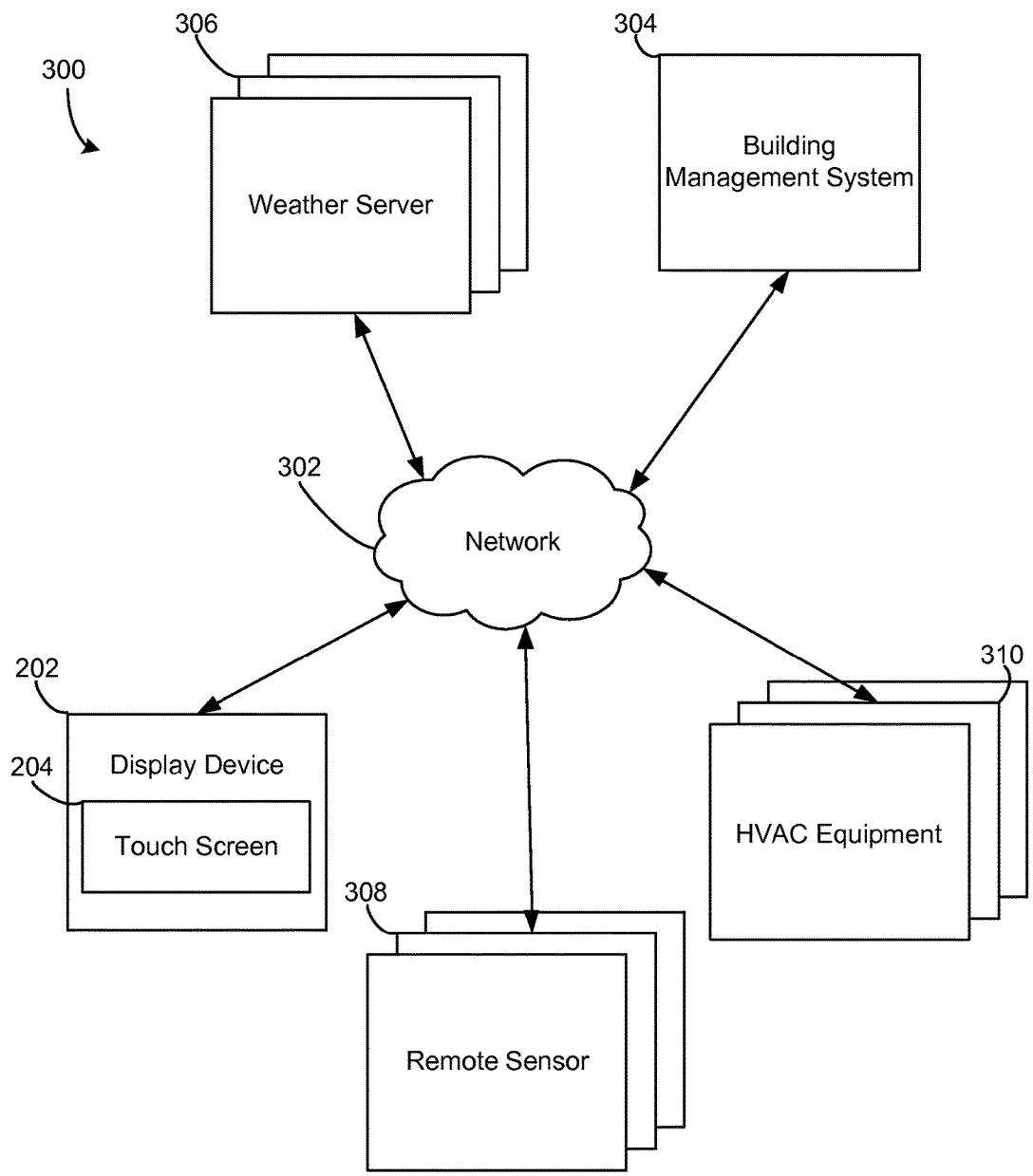
FIG. 3 is a block diagram illustrating various devices communicating across a network with the touch screen device of FIG. 2, according to an exemplary embodiment.

Referring now to FIG. 3, a system 300 of network connected devices and entities is shown, according to an exemplary embodiment. System 300 is shown to include display device 200 with touch screen 202 as described with reference to FIG. 2. System 300 is shown to include network 302, building management system 304, weather server(s) 306, and remote sensor(s) 308. In some embodiments, network 302 is at least one of and/or a combination of a Wi-Fi network, a wired Ethernet network, a Zigbee network, and a Bluetooth network. Network 302 may be a local area network or a wide area network (e.g., the Internet, a building WAN, etc.) and may use a variety of communications protocols (e.g., BACnet, IP, LON, etc.). In some embodiments, remote sensor 308 and/or any other device connected to display device 200 and/or building management system 304 via network 302, may indicate to display device 200 and/or building management system 304 that a sprinkler system is active. In some embodiments, when display device 200 receives a notification that the sprinkler system is active (i.e., when a fire alarm is triggered) display device 200 may determine that a touchscreen of display device 200 could be wet and display device 200 may operate touch screen device 200 in a single-touch mode.

Building management system 304 may be configured to communicate with display device 200 via network 302. Building management system 304 may be configured to adjust heating and/or cooling to the building of FIG. 1 and/or control the lighting of the building of FIG. 1. In some embodiments, building management system 304 receives zone and/or building control information from display device 200. The control information may be an environmental setpoint such as a temperature setpoint and/or a humidity setpoint. Further, the control information may be lighting control and/or any other facility control command.

Display device 200 may be configured to query the weather server(s) 306 for weather related information (e.g. high and/or low temperature, high and/or low humidity, high and/or low dew point, current temperature, current humidity, high and/or low dew point, current dew point etc.). The weather server(s) 306 may respond accordingly to each query sent from display device 200. In some embodiments, display device 200 is subscribed to weather server(s) 306 and may be pushed weather related information. When new information is entered into weather server(s) 306, the weather server(s) may be configured to push information to the display device 200. In some embodiments, display device 200 receives weather related information from more than one weather server and averages the received information. In some embodiments, the display device 200 attempts to query one weather server 306, waits for a reply, and if no reply is received sends a query to another weather server 306. In some embodiments, the weather information may be pushed to display device 200 when a parameter of the weather (e.g., a wind speed, a precipitation value, a humidity value, a temperature value, etc.) changes more than a predetermined amount.

Remote sensor(s) 308 are shown to communicate to network 302. In some embodiments, display device 200 is configured to communicate with remote sensor(s) 308 and receive environmental condition information from the remote sensor(s) 308. The environmental condition information may be a building and/or zone humidity, a building and/or zone temperature, a building and/or zone environmental setpoint and any other such information relating to the environmental condition of a zone and/or a building. In some embodiments, remote sensor(s) 308 are other display devices and/or thermostats (e.g. display device 200). In some embodiments, remote sensor(s) 308 are configured to communicate environmental condition information to the building management system 304. Building management system 304 may be configured to store the environmental condition information and push the information to display device 200. In some embodiments, display device 200 sends a request to building management system 304 for environmental condition information collected by remote sensor(s) 308 and/or stored in weather server 306. In some embodiments, remote sensor 308 may pass information directly to display device 202 via a wired and/or wireless connection.

Still referring to FIG. 3, HVAC equipment 310 is shown to be connected to network 302. In some embodiments, HVAC equipment is at least one of or a combination of a chiller 102 and a boiler 104 as described with reference to FIG. 1. Further, HVAC equipment 310 may include valves, actuators, cooling coils, heating coils and/or any other building device used to control an environment of a building zone. HVAC equipment 310 may be configured to maintain an environmental condition of a building (e.g., building 10). In some embodiments, the HVAC equipment 310 may receive a temperature setpoint from display device 200 and may be configured to maintain the temperature setpoint for the building (e.g., building 10) and/or a building space. In some embodiments, control signals are generated by display device 200. The control signals may be used to control the HVAC equipment 310 based on the control signals. Display device 200 may generate the control signals based on an environmental setpoint (e.g., temperature setpoint, humidity setpoint, etc.) received from touch screen 204. The environmental setpoint may be selected by a user on touch screen 204 when display device 200 is operating in either a single-touch mode and/or a multi-touch mode.

Figure 4:
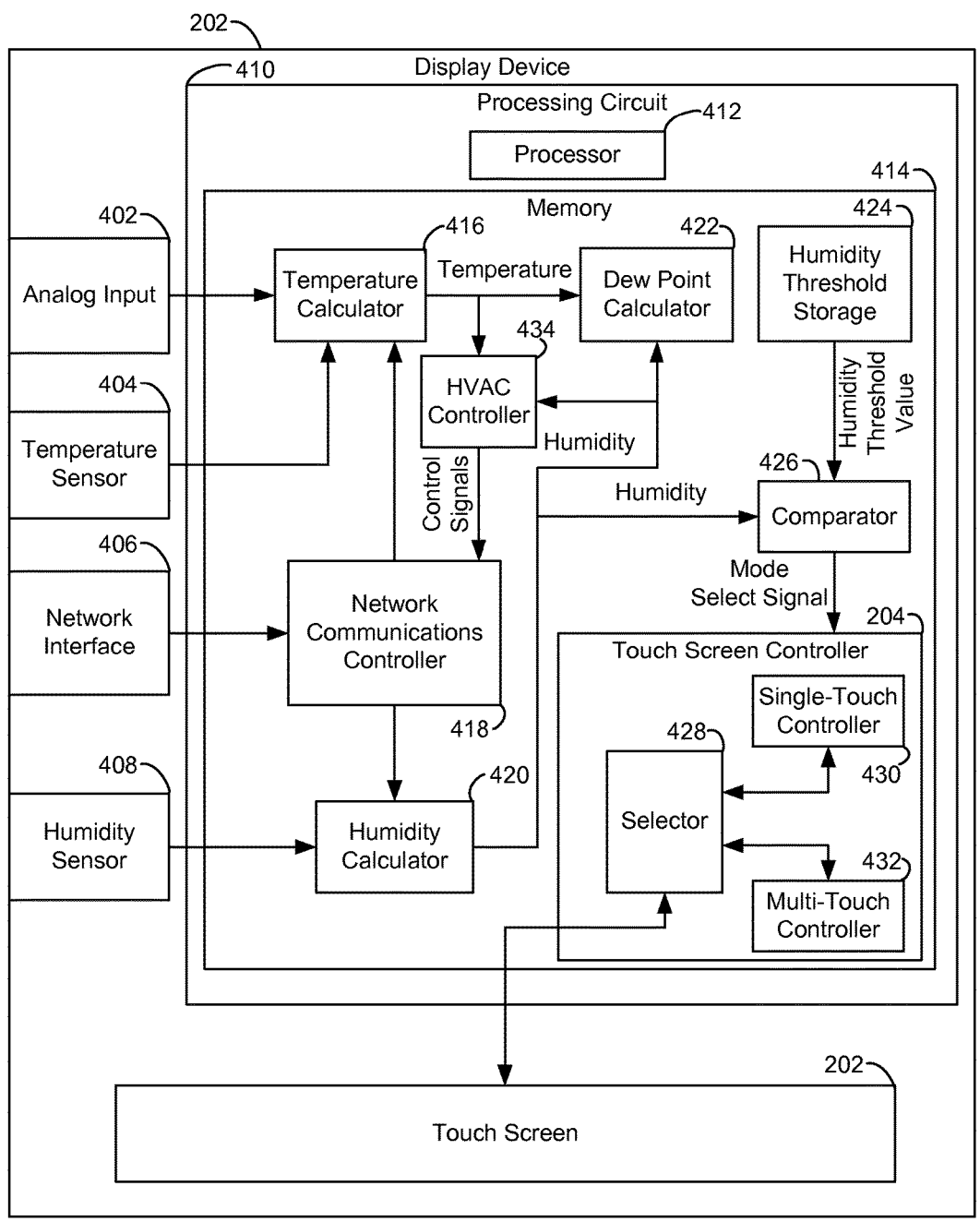
FIG. 4 is a block diagram illustrating the touch screen device of FIGS. 2 and 3 in greater detail, according to an exemplary embodiment.

Referring now to FIG. 4, a block diagram illustrating display device 200 in greater detail is shown, according to an exemplary embodiment. Display device 200 is shown to include a touch screen 202, an analog input 402, a temperature sensor 404, a network interface 406, a humidity sensor 408, and a processing circuit 410.

Analog input 402 may be configured to measure the ambient temperature of a building (e.g. building 10), a zone of the building, the internal temperature of display device 200, the temperature of touch screen 204, and/or any other temperature based on input received from temperature measuring devices. Analog input 402 may receive input from a resistive temperature measuring device (e.g., a thermocouple, a thermistor, a resistance thermometer etc.), a low voltage temperature sensor, a silicon bandgap temperature sensor, and any other electrical and/or mechanical device allowing temperature to be measured. In some embodiments, at least one of current, voltage, resistance, and/or any other measureable quantity proportional to the ambient temperature may be provided as an input to analog input 402. In some embodiments, a PWM wave, a sinusoidal wave, and/or any other signal may have characteristics (e.g., duty cycle, frequency, amplitude) proportional to the ambient temperature and/or humidity and may be provided as input to analog input 402. In some embodiments, analog input 402 receives input from a nickel-alloy thermocouple, a platinum based thermocouple, a tungsten based thermocouple, and/or any other type of thermocouple. Analog input 402 may receive input from or may be any other type or combination of temperature sensor and/or humidity sensors.

Temperature sensor 404 may be configured to measure the ambient temperature of a building (e.g. building 10), the temperature of a zone associated with the building, the internal temperature of display device 200, the temperature of touch screen 204 and/or any other temperature. Temperature sensor 404 may be a sensor outputting an analog signal (e.g., sinusoid, square wave, PWM wave, etc.) and/or a measureable value (e.g. current, voltage, resistance) and/or may be a temperature module outputting a digital value. Temperature sensor 404 may communicate a digital and/or analog value to temperature calculator 416. In some embodiments, temperature sensor 404 may be deployed in a location remote to display device 200 or may be located inside an enclosure of display device 200. Temperature sensor 404 may be any other type or combination of temperature sensor.

Network interface 406 may be configured to communicate with network 302 as described with reference to FIG. 3. Network interface 406 can be configured to communicate via local area networks (e.g., a building LAN), wide area networks (e.g., the Internet, a cellular network, etc.), and/or conduct direct communications (e.g., NFC, Bluetooth, etc.). In some embodiments, network interface 406 includes an application gateway configured to receive input from applications running on client devices. For example, network interface 406 can include one or more wireless transceivers (e.g., a WiFi transceiver, a Bluetooth transceiver, a NFC transceiver, a cellular transceiver, etc.) for communicating with mobile devices. In some embodiments, network interface 406 may communicate with remote sensor(s) 308 and/or weather server 306 as described with reference to FIG. 3 to receive environmental condition information. The environmental condition information may be a building and/or zone humidity, a building and/or zone temperature, an outdoor temperature and/or outdoor humidity and any other such information relating to the environmental condition of a zone and/or a building.

Humidity sensor 408 may be configured to measure the humidity of a building (e.g., building 10), a humidity of a zone of the building, the internal humidity of display device 200, the humidity associated with touch screen 204 (e.g. the humidity a set distance from display device 200) and/or any other humidity. Humidity sensor 408 may be a dry or wet bulb hygrometer, a dew point hygrometer, and/or an electronic hygrometer. In some embodiments, humidity sensor 408 may measure a relative humidity and/or an absolute humidity. In some embodiments, the relative humidity and/or the absolute humidity is measured based on changes in capacitance and/or changes in resistance determined by various components of humidity sensor 408. Humidity sensor 408 may be any other type or combination of humidity sensors.

Processing circuit 410 is shown to include processor 412 and memory 414. Processor 412 can be a general purpose or specific purpose processor, an application specific integrated circuit (ASIC), one or more field programmable gate arrays (FPGAs), a group of processing components, or other suitable processing components. Processor 412 may be configured to execute computer code or instructions stored in memory 414 or received from other computer readable media (e.g., CDROM, network storage, a remote server, etc.).

Memory 414 can include one or more devices (e.g., memory units, memory devices, storage devices, etc.) for storing data and/or computer code for completing and/or facilitating the various processes described in the present disclosure. Memory 414 can include random access memory (RAM), read-only memory (ROM), hard drive storage, temporary storage, non-volatile memory, flash memory, optical memory, or any other suitable memory for storing software objects and/or computer instructions. Memory 414 can include database components, object code components, script components, or any other type of information structure for supporting the various activities and information structures described in the present disclosure. Memory 414 can be communicably connected to processor 412 via processing circuit 410 and can include computer code for executing (e.g., by processor 412) one or more processes described herein.

Memory 414 is shown to include temperature calculator 416, network communications controller 418, humidity calculator 420, dew point calculator 422, humidity threshold storage 424, comparator 426, and a touch screen controller 204. Temperature calculator 416 is configured to determine the temperature of a building (e.g., building 10), a temperature of a zone associated with the building (e.g., an indoor zone and/or an outdoor zone), an internal temperature of display device 200, and/or the temperature of touch screen 204. Temperature calculator 416 is configured to receive inputs from analog input 402, temperature sensor 404 and network communications controller 418. Temperature calculator 416 may determine an appropriate calculation to make based on the type of the inputs, execute the calculation, and provide the temperature resulting from the calculation to dew point calculator 422.

In some embodiments, temperature calculator 416 is configured to convert a voltage value, a resistance value, a current value, a wave (e.g., sinusoid, square, saw, PWM, etc.), and/or any other value or signal received from analog input 402 and/or temperature sensor 404 into a digital value. Temperature calculator 416 can use the digital value to determine a temperature value corresponding to the resistance and/or voltage. In some embodiments, the equation used to convert the digital value into a temperature is an equation modeling the analog input device (e.g., a thermocouple equation). In some embodiments, temperature calculator 416 receives a temperature and/or a digital value associated with a temperature from network communications controller 418. Network communications controller 418 may receive temperature data from weather server(s) 306 and/or remote sensor(s) 308 as described with reference to FIG. 3.

Network communications controller 418 may contain instructions to communicate with a network (e.g., network 302). In some embodiments, Network communications controller 418 contains instructions to communicate over a Wi-Fi network, a Zigbee network, and/or a Bluetooth network via network interface 406. Network communications controller 418 may be able to facilitate communication a local area network or a wide area network (e.g., the Internet, a building WAN, etc.) and may be configured to use a variety of communications protocols (e.g., BACnet, IP, LON, etc.).

Humidity calculator 420 is configured to determine the humidity of a building (e.g., building 10), a humidity of a zone associated with the building (e.g., an indoor zone and/or an outdoor zone), an internal humidity of display device 200, and/or a humidity associated of touch screen 204 (e.g., a humidity a set distance from touch screen 204). Humidity calculator 420 is configured to receive humidity sensor input from humidity sensor 408. Humidity calculator 420 may be configured to determine a humidity value based on an analog and/or digital value received from humidity sensor 408. In some embodiments, humidity calculator 420 is configured to receive humidity data from network communications controller 418. For example, network communications controller 418 can communicate with weather server(s) 306 and/or remote sensor(s) 308 via network interface 406 to obtain humidity data from a remote source, as described with reference to FIG. 3.

Dew point calculator 422 is configured to determine the dew point of a building (e.g., building 10), a dew point of a zone associated with the building (e.g., an indoor zone and/or an outdoor zone), a dew point of display device 200, and/or a dew point associated with touch screen 204 (e.g., a humidity a set distance from touch screen 204). Dew point calculator 422 is configured to receive a temperature value from temperature calculator 416 and a humidity value from humidity calculator 420. In some embodiments, dew point calculator 416 is configured to compute a dew point value indicating the amount of moisture in the air based on a temperature input received from temperature calculator 416 and a humidity input received from humidity calculator 420.

Humidity threshold storage 424 contains a humidity threshold value. In some embodiments, the humidity threshold value is preconfigured in humidity threshold storage 424. In some embodiments, an update to humidity threshold storage 424 can be received from the building management system 304 described with reference to FIG. 3 via network interface 406. Humidity threshold storage 424 can be configured to send the humidity threshold value to comparator 426. Comparator 426 can be configured to determine if the humidity value received from humidity calculator 420 exceeds the threshold humidity value. Comparator 426 can be configured to generate a mode select signal based on the comparison. In some embodiments, the mode select signal is a Boolean value. The Boolean value may be true if the humidity value exceeds the humidity threshold value and may be false when the humidity does not exceed the humidity threshold value. The mode select signal may identify what operating mode (e.g., single touch mode and multi-touch mode) the display device 202 should operate in. In some embodiments, comparator 426 generates a mode select signal which indicates that display device 202 should operate in the single-touch mode in response to a determination that the measured humidity exceeds the humidity threshold. Conversely, comparator 426 can generate a mode select signal which indicates that display device 202 should operate in the multi-touch mode in response to a determination that the measured humidity does not exceed the humidity threshold. Comparator 426 can provide the mode select signal to selector 428.

Touch screen controller 204 may be configured to operate touch screen 202 in a single touch mode and/or a multi touch mode based on a mode select signal received from comparator 508. In some embodiments, operating the touch screen 202 includes determining one or more touch locations on the touch screen 202 and determining touch movements such as a tap, a pinch, a spread, etc. Touch screen controller 204 includes a selector 428, a single-touch controller 430, and a multi-touch controller 432. In some embodiments, touch screen controller 204 is a software module inside memory 414. In some embodiments, single-touch controller 430 and multi-touch controller 432 are modes of touch screen controller 204. In various embodiments, touch screen controller 204 is implemented on its own integrated circuit apart from processing circuit 410.

In some embodiments, single-touch controller 430 operates touch screen 202 to determine single touches. Single-touch controller 430 may be configured to identify one touch to the touch screen 202 at a time rather than determining multiple touches concurrently occurring on touch screen 202. Single-touch controller may ignore multiple concurrent touches and/or may average the location of a single touch from the multiple concurrent touches based on the coordinates at which the concurrent touches occur. Single-touch controller 430 may determine single touches such as a tap, a nudge, a drag and/or a flick. The single-touch controller 430 may determine the nature of the single-touch based on the manner that the single-touch location moves across touch screen 202. Single-touch controller 430 may allow for rotation by displaying a rotation button (e.g., rotate clockwise, rotate counter clockwise, etc.) on touch screen 202. Single-touch controller 430 may allow for zooming in and out on an image and/or screen by displaying a zoom-in and/or zoom-out button (e.g., a "plus" symbol button, a "minus" symbol button, etc.)

In some embodiments, a multi-touch controller 432 is configured to operate touch screen 202 as a multi-touch touch screen. In some embodiments, multi-touch controller 432 is configured to identify a single touch and multiple concurrent touches. Multi-touch controller 432 may be configured to determine a gesture such as a pinch or a spread. In some embodiments, multi-touch controller 432 may identify that two fingers and/or styli are placed on the touch screen 202. The multi-touch controller 432 may identify these touches to the touch screen 202 as touch locations and may determine that the touch locations are moving closer together. The multi-touch controller 432 may interpret this gesture as a pinch and may identify a rate at which the touch points are nearing each other. In some embodiments, the multi-touch controller 432 controller may interpret two touch locations moving away from each other as a spread. The multi-touch controller 432 may determine a rate of change at which the touch locations are moving away from each other. Further, the multi-touch controller 432 may identify single-touches to the touch screen 202 such as taps, nudges, and drags.

Selector 428 may be configured to select between operating touch screen 202 in a single-touch mode and a multi-touch mode by switching between single-touch controller 430 and multi-touch controller 432. Selector 428 can be configured to receive a mode select signal from comparator 426, data from single-touch controller 430, and data from multi-touch controller 432. In some embodiments, the data received from single-touch controller 430 and/or multi-touch controller 432 are graphics to be displayed on touch screen 202. Selector 428 is configured to provide input from the single-touch controller 430 and/or input from the multi-touch controller 432 to the touch screen 202. Further, selector 428 is configured to provide input from touch screen 202 to single-touch controller 430 and/or multi-touch controller 432. In some embodiments, selector 428 is a two-to-one multiplexer and connects either the single-touch controller 430 or the multi-touch controller 432 to touch screen 202. In some embodiments, if the mode select signal is true, the selector 428 may connect the single-touch controller 430 to touch screen 202. If the mode select signal is false, the selector 428 may be configured to connect the multi-touch controller 432 to touch screen 202.

Still referring to FIG. 4, memory 414 is shown to include HVAC controller 434. HVAC controller 434 may receive a temperature value from temperature calculator 416 and a humidity value from humidity calculator 420. HVAC controller 434 may use the temperature and the humidity to determine appropriate control actions for HVAC equipment 310 as described with reference to FIG. 3. In some embodiments, HVAC controller 434 provides a control signal to HVAC equipment 310 via network communications controller 418 and/or network interface 406. The control signal may cause the HVAC equipment 310 to condition and/or heat a zone and/or building to a setpoint temperature. Further, the control signals may cause HVAC equipment 310 to achieve a humidity value in a building and/or zone based on a humidity setpoint.

HVAC controller 434 may use any of a variety of control algorithms (e.g., state-based algorithms, extremum-seeking control algorithms, PID control algorithms, model predictive control algorithms, feedback control algorithms, etc.) to determine appropriate control actions for the HVAC equipment 310 as a function of the temperature and/or the humidity. For example, if the temperature is above a temperature set point received from temperature sensor 404, HVAC controller 434 may determine that a cooling coil and/or a fan should be activated to decrease the temperature of an supply air delivered to a building zone. Similarly, if the temperature is below the temperature set point, HVAC controller 434 may determine that a heating coil and/or a fan should be activated to increase the temperature of the supply air delivered to the building zone. HVAC controller 434 may determine that a humidification or dehumidification component of HVAC equipment 310 should be activated or deactivated to control the compensated relative humidity to a humidity set point for a zone of a building zone.

Figure 5:
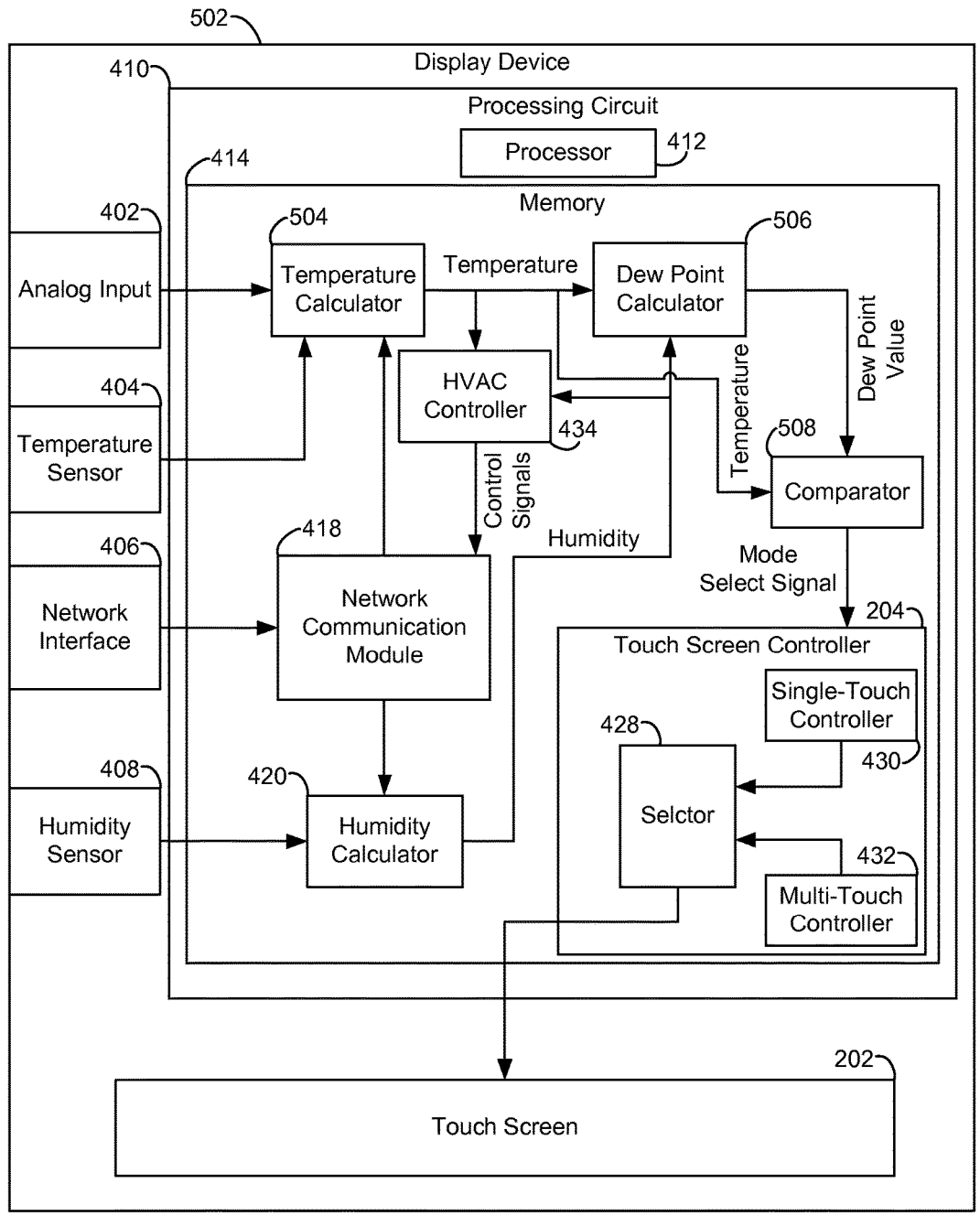
FIG. 5 is a block diagram illustrating another embodiment of the touch screen device of FIG. 4, according to an exemplary embodiment.

Referring now to FIG. 5, display device 502 is shown as an alternate embodiment of display device 200. Various components of display device 502 shown are the same as in display device 200 as described with reference to FIGS. 2-4. Display device 502 is shown to include temperature calculator 504, dew point calculator 506, comparator 508, as well as other various components of FIG. 4. Temperature calculator 504 performs the same functionality as temperature calculator 416 as described with reference to FIG. 4 but also sends a temperature value to comparator 508. Dew point calculator 506 performs the same functionality as dew point calculator 422 described with reference to FIG. 4 but also sends a dew point value to comparator 508. Comparator 508 is configured to receive the temperature value from temperature calculator 504 and a dew point value from dew point calculator 506.

Comparator 508 is configured to generate a mode select signal and provide the mode select signal to selector 428. In some embodiments, the mode select signal is a Boolean value causing the selector 428 so select between single-touch controller 430 and multi-touch controller 432. In some embodiments, comparator 508 generates a true mode select signal (i.e., select single-touch controller 430) when the temperature value is within a set value from the dew point value or equal to the dew point. In some embodiments, comparator 508 generates a false mode select signal (i.e., select multi-touch controller 432) when dew point value is not within a set value from the dew point value and is not equal to the dew point. In some embodiments, comparator generates a true mode select signal (i.e., select single-touch controller 430) when the dew point value is above a threshold dew point value. In some embodiments, comparator generates a false mode select signal (i.e., select multi-touch controller 432) when the dew point value is below a threshold dew point value.

Flow Diagrams

Figure 6:
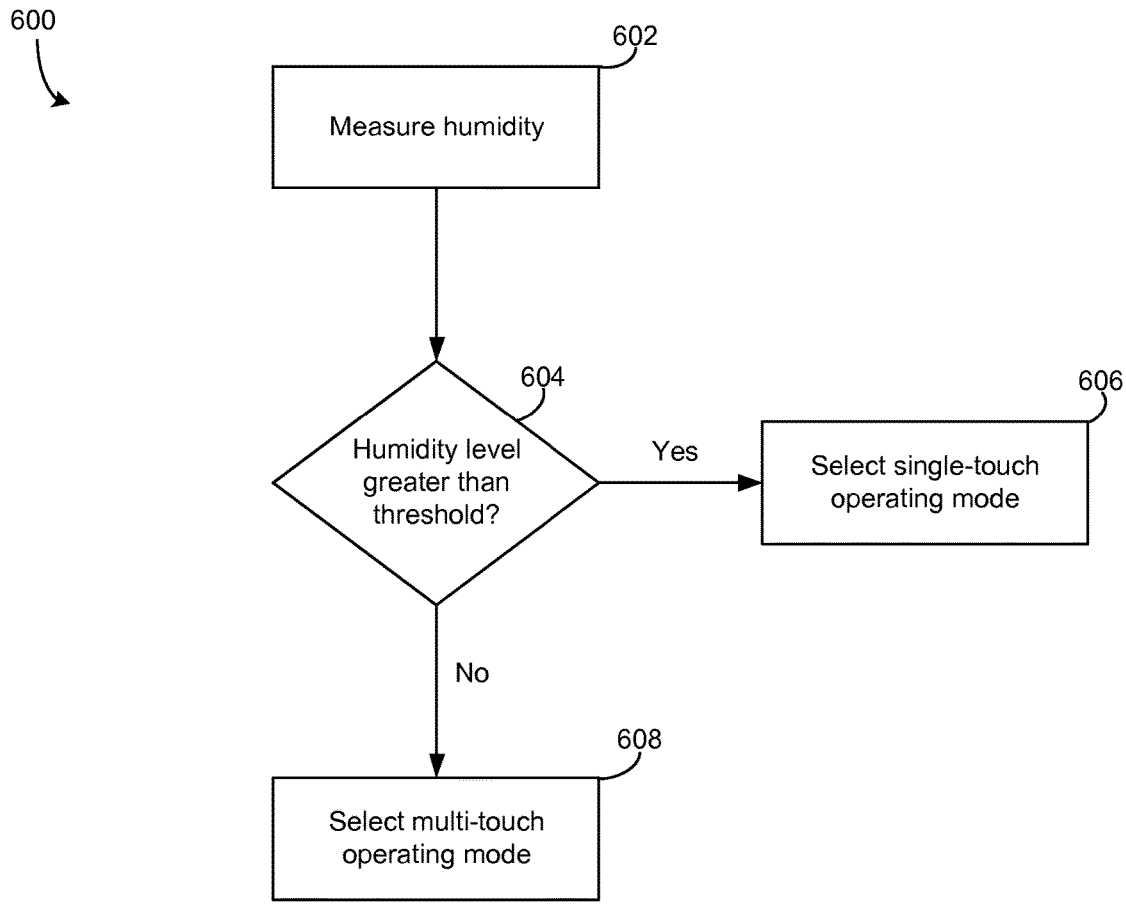
FIG. 6 is a flowchart of operations for selecting an operating mode for a touch screen based on humidity that can be performed by the touch screen device of FIG. 4, according to an exemplary embodiment.

Referring now to FIG. 6, a flow diagram of process 600 for selecting between single-touch operating mode and multi-touch operating mode for a touch screen based on a humidity value is shown, according to an exemplary embodiment. In some embodiments, process 600 is performed by display device 200, as described with reference to FIGS. 2-4. In step 602, a display device (e.g., display device 200) is configured to measure a humidity value. In some embodiments, the display device measures the humidity with humidity sensor 408 and humidity calculator 420 as described with reference to FIG. 4. In some embodiments, the humidity value is a humidity value a set distance away from touch screen 202 as described with reference to FIGS. 2-4. In some embodiments, the humidity value is a humidity value of the zone the display device is located in. In some embodiments, operating the touch screen in single-touch operating mode is performed by operating the touch screen with single-touch controller 430. Operating the touch screen in multi-touch operating mode may be performed by operating the touch screen with multi-touch controller 432.

In step 604, a comparison is performed between a threshold humidity value and a measured humidity value. If the measured humidity value is greater than the threshold value, the display of the display device is configured to operate in a single-touch operating mode by selecting a single-touch controller to operate the display (step 606). The single-touch controller may only recognize one touch to the display at a time. The single-touch controller may operate the display in such a way that the user is not allowed to pinch, zoom, or rotate using multiple fingers. In single touch operating mode, a user may be presented with buttons to perform actions such as zoom or rotate which can be activated with a single touch and/or successive touches. If the user presses the display with two fingers (concurrent touches) or otherwise tries to operate the display in a multi-touch operating mode, the display may average the locations of the touches and/or may display a message to the user that the display is operating in a single-touch operating mode and/or ignore the concurrent touches. If the measured humidity value is less than the threshold value, the display of the display device is configured to operate in a multi-touch operating mode by selecting a multi-touch controller (step 608). The multi-touch controller may allow a user to make multiple concurrent touches to the display. Multiple concurrent touches in multi-touch operating mode may be recognized by the multi-touch controller as a pinch, a zoom, and/or a rotate. Also, the multi-touch controller may be able to implement all or some of the functionality of the single-touch controller.

Figure 7:
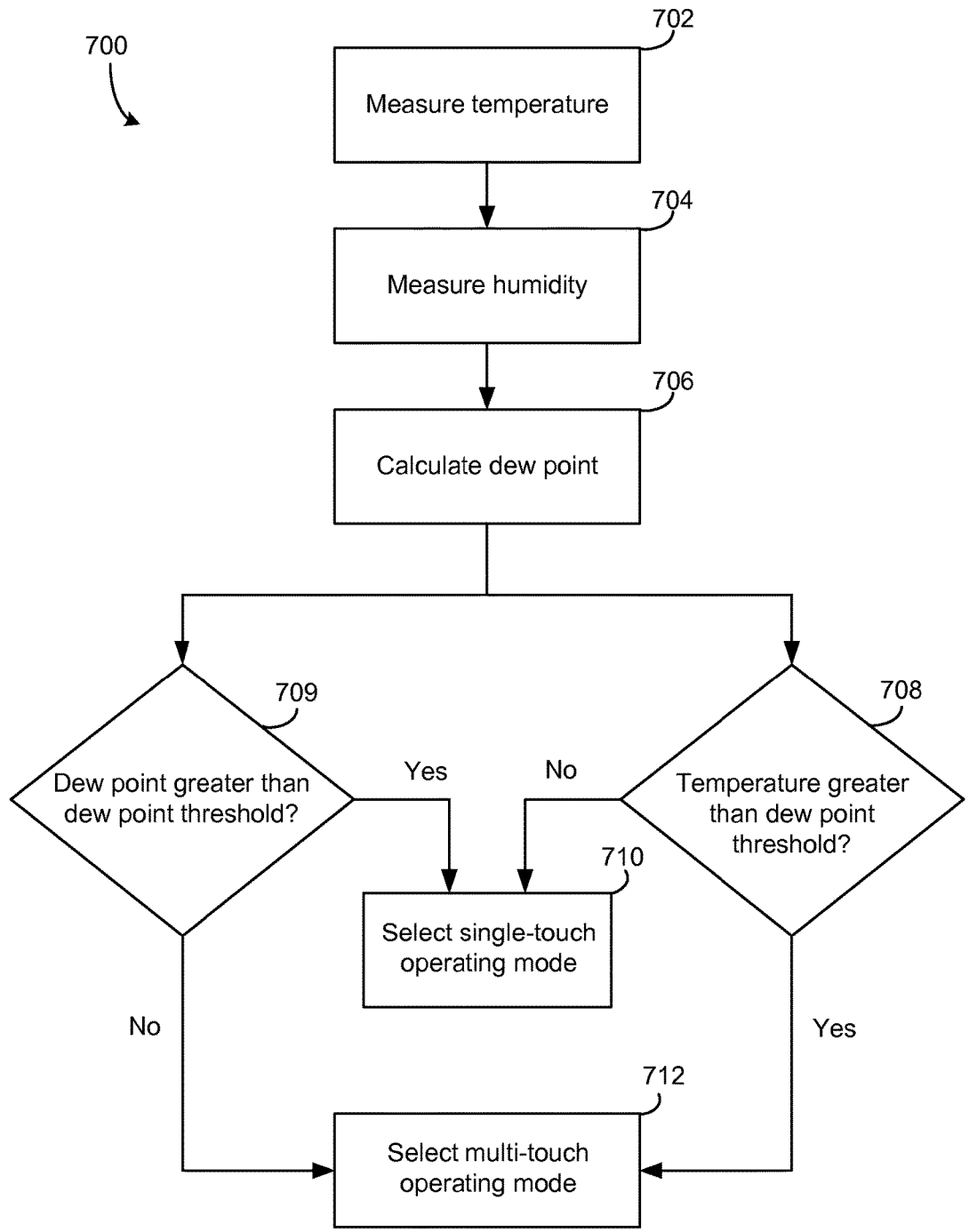
FIG. 7 is a flowchart of operations for selecting an operating mode for a touch screen based on dew point that can be performed by the touch screen device of FIG. 5, according to an exemplary embodiment.

Referring now to FIG. 7, a flow diagram of process 700 for selecting between a single-touch operating mode and multi-touch operating mode for a touch screen based on a dew point value is shown, according to an exemplary embodiment. In some embodiments, process 700 is performed by display device 502 as described with reference to FIG. 5. In step 702, a display device (e.g. display device 502) measures a temperature value. In some embodiments, the display device measures the temperature with temperature sensor 404 and temperature calculator 416 as described with reference to FIG. 4. In some embodiments, the temperature value is a temperature value a set distance away from a touch screen as described with reference to FIGS. 2-4. In some embodiments, the temperature value is an ambient temperature value for the zone the display device is located in. In some embodiments, operating the touch screen in single-touch operating mode is performed by operating the touch screen with single-touch controller 430. Operating the touch screen in multi-touch operating mode may be performed by operating the touch screen with multi-touch controller 432.

In step 704, the display device (e.g. display device 502) is configured to measure a humidity value. In some embodiments, the display device measures the humidity with humidity sensor 408 and humidity calculator 420 as described with reference to FIG. 4. In some embodiments, the humidity value is a humidity value a set distance away from a touch screen display (e.g. touch screen 202). In some embodiments, the humidity value is a humidity value of the zone the display device is located in. The display device is configured to calculate a dew point based on the measured temperature in step 702 and the measured humidity in step 704 (step 706). Using the calculated dew point in step 706, the display device is configured to determine if the temperature value measured in step 702 is greater than a dew point threshold (step 708). In various embodiments, the dew point threshold can be the dew point or a predetermined offset from the dew point (e.g., dew point plus a fixed number of degrees). Condensation may occur when the measured temperature is less than or equal to the dew point. Accordingly, a measured temperature less than or equal to the dew point threshold may indicate that the air is fully saturated with humidity (e.g., air temperature is less than the dew point) or that the air is close to fully saturated with humidity (e.g., air temperature above dew point but less than dew point threshold).

In step 708, if the measured temperature value is not greater than the dew point threshold (i.e., the measured temperature value is less than or equal to the dew point threshold), the display of the display device is configured to operate in a single-touch operating mode by selecting a single-touch controller (step 710). In single-touch operating mode, the display may only be able to recognize one touch to the display at a time. If the measured temperature value is greater than the dew point threshold, the display of the display device is configured to operate in a multi-touch operating mode by selecting a multi-touch controller (step 712). In a multi-touch mode, the display may be able to recognize multiple touches to the display at a time. In some embodiments, the user may be allowed to rotate, zoom, pinch, spread, by pressing the touch screen with multiple concurrent touches. Buttons associated with single-touch operating mode (e.g., zoom in button, zoom out button, rotate left, rotate right) may not be present when in multi-touch operating mode.

In some embodiments, the dew point calculated in step 706 can be compared to a dew point threshold. A high calculated dew point may correspond to high measured humidity, whereas a lower calculated dew point may correspond to lower measured humidity. If the calculated dew point is greater than a dew point threshold (step 709), the display of the display device is configured to operate in a single-touch operating mode by selecting a single-touch controller (step 710). If the calculated dew point is not greater than the dew point threshold (i.e., the calculated dew point is less than or equal to the dew point threshold), the display of the display device is configured to operate in a multi-touch operating mode by selecting a multi-touch controller (step 712).

Figure 8:
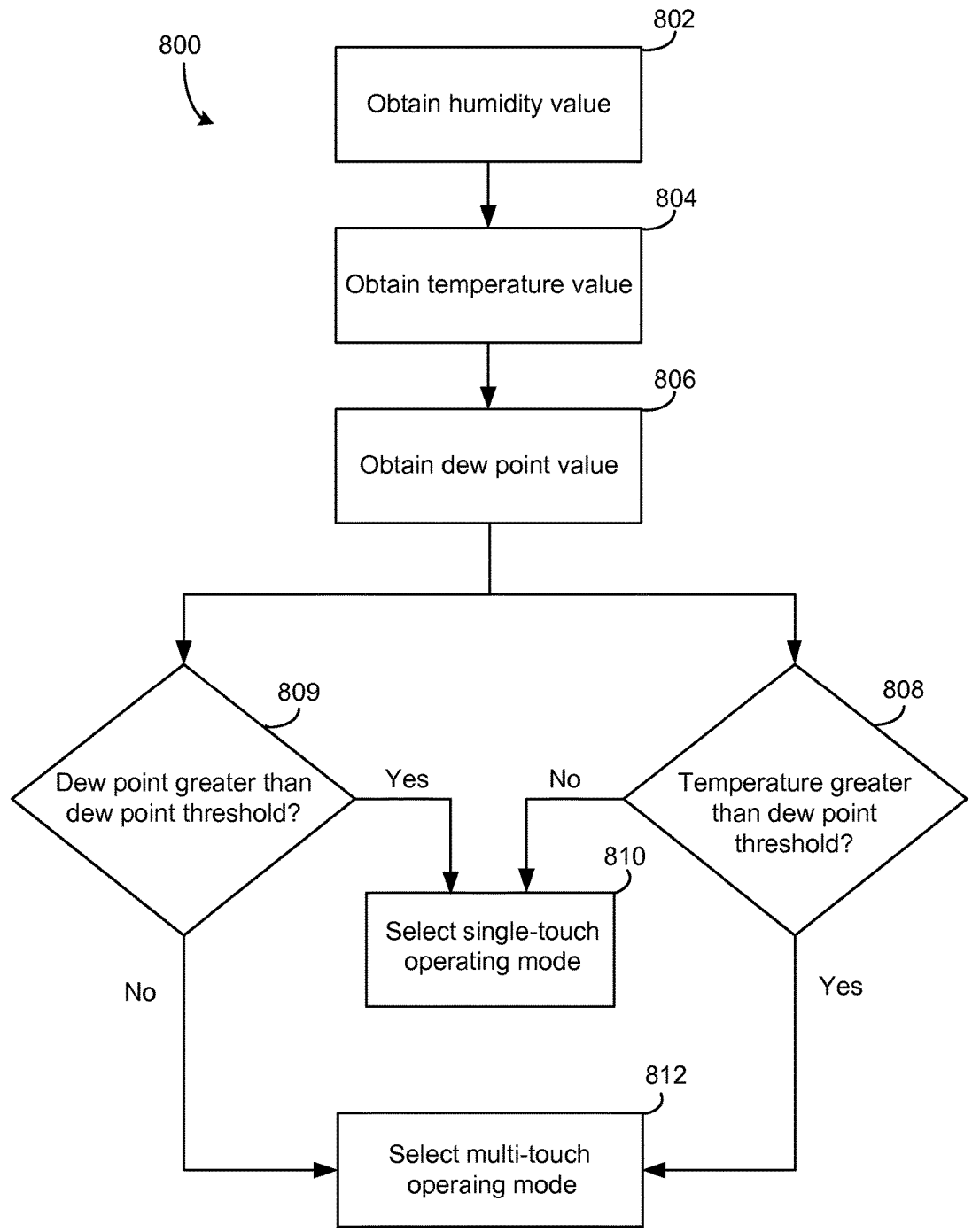
FIG. 8 is a flowchart of operations for selecting an operating mode for a touch screen based on dew point that can be performed by the touch screen device of FIG. 5, according to an exemplary embodiment.

Referring now to FIG. 8, a flow diagram of process 800 for selecting between a single-touch operating mode and a multi-touch operating mode for a touch screen based on a dew point value or a humidity is shown, according to an exemplary embodiment. In some embodiments, process 700 is performed by display device 200 as described with reference to FIGS. 2-4 and/or display device 502 as described with reference to FIG. 5. The single-touch operating mode may not allow touch movements such as to pinch, zoom, or rotate using multiple simultaneous touches. In single-touch mode, a user may be presented with buttons to perform actions such as zoom or rotate which can be activated with a single touch. If the user presses the display with two fingers (concurrent touches) or otherwise tries to operate the display in a multi-touch mode, the display may average the locations of the touches, display a message to the user that the display is operating in a single-touch mode, and/or ignore the concurrent touches. The multi-touch operating mode may allow a user to make multiple concurrent touches to the display. Multiple concurrent touches may be recognized as a pinch, a zoom, and/or a rotate, when operating in multi-touch mode. Also, multi-touch operating mode may to implement all or some of the functionality of single-touch operating mode. In some embodiments, operating the touch screen in single-touch operating mode is performed by operating the touch screen with single-touch controller 430. Operating the touch screen in multi-touch operating mode may be performed by operating the touch screen with multi-touch controller 432.

In step 802, the display device is configured to obtain a humidity value. In some embodiments, the display device obtains the humidity value by measuring the humidity with humidity sensor 408 and humidity calculator 420 as described with reference to FIGS. 4-5. In some embodiments, the display device is configured to obtain a humidity value by communicating to weather server(s) 306 and/or remote sensor(s) 308 as described with reference to FIG. 3. In some embodiments, the humidity value is a humidity value a set distance away from a display. In some embodiments, the humidity value is a humidity value of the zone the display device is located in.

In step 804, the display device is configured to obtain a temperature value. In some embodiments, the display device obtains the temperature value by measuring the temperature with temperature sensor 404 and temperature calculator 416 as described with reference to FIGS. 4-5. In some embodiments, the display device is configured to obtain a temperature value by communicating to weather server(s) 306 and/or remote sensor(s) 308. In some embodiments, the temperature value is a temperature of the display. In some embodiments, the temperature value is a temperature value of the zone the display device is located in.

In step 806, the display device is configured to obtain a dew point value. In some embodiments, the display device obtains the dew point value by calculating the dew point with the temperature value and humidity value obtained in steps 802 and 804. In some embodiments, the display device is configured to obtain a dew point value by communicating to weather server(s) 306 and/or remote sensor(s) 308. In some embodiments, the dew point value is a dew point value a set distance away from a display, a dew point in a building, and/or a dew point in a zone of the building. In some embodiments, the dew point value is a dew point value of the zone the display device is located in.

In step 808, the display device determines if a temperature measured in step 804 is greater than a dew point threshold. In various embodiments, the dew point threshold can be the dew point or a predetermined offset from the dew point (e.g., dew point plus a fixed number of degrees). Condensation may occur when the measured temperature is less than or equal to the dew point. Accordingly, a measured temperature less than or equal to the dew point threshold may indicate that the air is fully saturated with humidity (e.g., air temperature is less than the dew point) or that the air is close to fully saturated with humidity (e.g., air temperature above dew point but less than dew point threshold). If the measured temperature value is not greater than the dew point threshold (i.e., the measured temperature is less than or equal to the dew point threshold), the display device may be configured to operate in single-touch operating mode by selecting a single-touch controller (step 810). If the measured temperature value is greater than the dew point threshold, the display device may be configured to operate in multi-touch operating mode by selecting a multi-touch controller (step 812).

In some embodiments, the dew point calculated in step 806 can be compared to a dew point threshold. A high calculated dew point may correspond to high measured humidity, whereas a lower calculated dew point may correspond to lower measured humidity. If the calculated dew point is greater than a dew point threshold (step 809), the display of the display device may be configured to operate in a single-touch operating mode by selecting a single-touch controller (step 810). If the calculated dew point is not greater than the dew point threshold (i.e., the calculated dew point is less than or equal to the dew point threshold), the display of the display device may be configured to operate in a multi-touch operating mode by selecting a multi-touch controller (step 812).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A thermostat for a building space, the thermostat comprising:
   a touch screen user interface configured to present display data to a user and receive touch-based input from the user;
   one or more processing circuits configured to:
   select an operating mode for the touch screen user interface to be one of a single-touch operating mode or a multi-touch operating mode based on a comparison of a value of an environmental condition of the building space to a threshold, wherein the comparison of the value of the environmental condition to the threshold indicates whether the value of the environmental condition is suitable for operating the touch screen user interface in the single-touch operating mode or the multi-touch operating mode;
   operate the touch screen user interface in the single-touch operating mode when the single-touch operating mode is selected; and operate the touch screen user interface in the multi-touch operating mode when the multi-touch operating mode is selected.

2. The thermostat of claim 1, wherein the thermostat further comprises a network interface configured to receive the value of the environmental condition of the building space from at least one of one or more weather servers and one or more remote sensors.

3. The thermostat of claim 1, wherein the thermostat further comprises one or more sensors configured to measure the value of the environmental condition of the building space.

4. The thermostat of claim 3, wherein the sensors comprise a humidity sensor configured to measure a humidity value of the building space, wherein the one or more processing circuits are configured to select the operating mode based on the measured humidity value.

5. The thermostat of claim 3, wherein the sensors comprise a temperature sensor configured to measure a temperature value of the building space, wherein the one or more processing circuits are configured to select the operating mode based on the measured temperature value.

6. The thermostat of claim 1,
wherein the value of the environmental condition of the building space comprises one of a humidity value of the building space, a dew point of the building space, and a temperature value of the building space.

7. The thermostat of claim 1, wherein the one or more processing circuits are configured to select an operating mode for the touch screen user interface by:
selecting the single-touch operating mode for the touch screen user interface in response to a determination that a humidity value of the building space exceeds a humidity threshold; and
selecting the multi-touch operating mode for the touch screen user interface in response to a determination that the humidity value of the building space does not exceed the humidity threshold.

8. The thermostat of claim 1, wherein the one or more processing circuits are configured to:
receive one or more environmental setpoints via the touch screen user interface; and
cause HVAC equipment communicatively coupled to the thermostat to control the one or more environmental conditions of the building space to the one or more environmental setpoints.

9. The thermostat of claim 1, wherein the one or more processing circuits are configured to operate the touch screen user interface in the single-touch operating mode when the single-touch operating mode is selected by determining single-touch inputs and not multi-touch inputs based on the touch based input;
wherein the one or more processing circuits are configured to operate the touch screen user interface in the multi-touch operating mode when the multi-touch operating mode is selected by determining the single-touch inputs and the multi-touch inputs based on the touch based input.

10. A touch-sensitive display device comprising:
a touch screen user interface configured to present display data to the user and receive touch-based input from the user;
one or more processing circuits configured to:
select an operating mode for the touch screen user interface to be one of a single-touch operating mode or a multi-touch operating mode based on a comparison of a value of an environmental condition of a space to a threshold, wherein the comparison of the value of the environmental condition to the threshold indicates whether the value of the environmental condition is suitable for operating the touch screen user interface in the single-touch operating mode or the multi-touch operating mode;
operate the touch screen user interface in the single-touch operating mode when the single-touch operating mode is selected; and
operate the touch screen user interface in the multi-touch operating mode when the multi-touch operating mode is selected.

11. The device of claim 10, wherein the device further comprises a network interface configured to receive the value of the environmental condition from one or more weather servers.

12. The device of claim 10, wherein the value of the environmental condition comprises one of a humidity value, a dew point value, and a temperature value.

13. The device of claim 10, wherein the one or more processing circuits are configured to select the operating mode for the touch screen user interface by:
selecting the single-touch operating mode for the touch screen user interface in response to a determination that a humidity value of the space exceeds a humidity threshold; and
selecting the multi-touch operating mode for the touch screen user interface in response to a determination that the humidity value of the space does not exceed the humidity threshold.

14. The device of claim 10, wherein the one or more processing circuits are configured to:
receive one or more environmental setpoints via the touch screen user interface; and
cause HVAC equipment communicatively coupled to the device to control the one or more environmental conditions of the space to the environmental setpoints.

15. A method for operating a thermostat for a building space, the method comprising:
presenting display data to a user via a touch screen user interface and receiving touch-based input from the user via the touch screen user interface;
detecting a value of an environmental condition of the building space;
automatically selecting, by one or more processing circuits of the thermostat, an operating mode for the touch screen user interface to be one of a single-touch operating mode or a multi-touch operating mode based on a comparison of the value of the environmental condition of the building space to a threshold, wherein the comparison of the value of the environmental condition to the threshold indicates whether the value of the environmental condition is suitable for operating the touch screen user interface in the single-touch operating mode or the multi-touch operating mode;
operating, by the one or more processing circuits, the touch screen user interface in the single-touch operating mode when the single-touch operating mode is selected; and
operating, by the one or more processing circuits, the touch screen user interface in the multi-touch operating mode when the multi-touch operating mode is selected.

16. The method of claim 15, wherein the method further comprises receiving, by the one or more processing circuits, the environmental condition from at least one of one or more weather servers and one or more remote sensors.

17. The method of claim 15, wherein the method further comprises:
- receiving, by the one or more processing circuits, one or more environmental setpoints via the touch screen user interface; and
- causing, by the one or more processing circuits, HVAC equipment communicatively coupled to the thermostat to control the one or more environmental conditions of the building space to the one or more environmental setpoints.

18. The method of claim 15, wherein detecting the value of the environmental condition comprises measuring the value of the environmental condition with one or more sensors, wherein the sensors comprise:
- a humidity sensor configured to measure a humidity value of a building space; and
- a temperature sensor configured to measure a temperature value of the building space.

19. The method of claim 15,
wherein the value of the environmental condition of the building space comprises one of a humidity value of the building space, a dew point value of the building space, and a temperature value of the building space.

20. The method of claim 15, wherein selecting, by the one or more processing circuits, the operating mode for the touch screen user interface comprises:
- selecting the single-touch operating mode for the touch screen user interface in response to a determination that a humidity value of the building space exceeds a humidity threshold; and
- selecting the multi-touch operating mode for the touch screen user interface in response to a determination that the humidity value of the building space does not exceed the humidity threshold.

* * * * *